Aug. 13, 1957 W. E. TOLLES 2,802,983
EDDY-CURRENT COMPENSATION
Filed Aug. 21, 1944 2 Sheets-Sheet 1

INVENTOR.
Walter E. Tolles
BY
Walter S. Parol
attorneys

INVENTOR.
Walter E. Tolles

United States Patent Office 2,802,983
Patented Aug. 13, 1957

2,802,983

EDDY-CURRENT COMPENSATION

Walter E. Tolles, Mineola, N. Y., assignor to the United States of America as represented by the Secretary of the Navy Application August 21, 1944, Serial No. 550,415

2 Claims. (Cl. 324—43)

This invention relates to the compensation of magnetic fields of aircraft, and more particularly to compensation of magnetic fields produced by eddy currents flowing in the structures of aircraft.

When aircraft are equipped with portable magnetometers or other magnetically sensitive indicating instruments dependent for their operation upon the measurement of the magnetic field component in a chosen direction, as for example in the direction of the earth's magnetic field vector, unsatisfactory operation may result due to the presence of magnetic fields caused by magnetic and conducting materials in the aircraft structure. It is found that, after interfering fields induced in magnetic members of the structure and those due to permanently magnetized structural members are compensated, other interfering fields remain. These fields are due to eddy currents flowing in conducting portions of the aircraft structure.

Aircraft are in general formed either wholly or in part of large sheets and closed loops of conducting material. Time changes of the magnetic flux linking these sheets and loops induce currents therein, and these currents in turn give rise to magnetic fields referred to hereinafter as eddy-current magnetic fields. Since an aircraft is continuously in the earth's magnetic field, time changes of the magnetic flux linking its structure occur whenever it changes its attitude in the execution of a maneuver. Thus a magnetometer mounted in the aircraft and arranged to measure magnetic fields in the direction of the earth's magnetic vector will give an indication due to stray eddy-current magnetic fields whenever the aircraft rolls, pitches, or otherwise maneuvers. Such spurious indications may be large enough completely to mask indications caused by the magnetic field component desired to be measured.

Consideration of the structure of the typical aircraft indicates that it comprises a complex assemblage of sheets and loops. Accordingly, the total eddy-current magnetic field produced when the aircraft changes its attitude may be exceedingly complex in nature, and its direction and magnitude are not easily calculated from the geometry of the structure by which it is produced.

It is an object of the present invention to provide methods and means whereby compensation of the eddy-current magnetic fields of aircraft may be carried out without prior knowledge of the distribution or relative orientations of field-producing members of the aircraft structure.

Accordingly, there is proposed the method of compensating the eddy-current magnetic field of an aircraft to facilitate operation of a magnetometer mounted therein for measuring magnetic field components in a chosen direction, which includes choosing a set of reference axes in respect to the aircraft such that the components of the eddy-current magnetic field along each of the axes produce separately identifiable contributions to the output indication of the magnetometer when the aircraft maneuvers, causing the aircraft to maneuver in such fashion that a component of eddy-current magnetic field along one of the axes produces an identifiable contribution to the output of the magnetometer, producing a compensating field effective in the chosen direction, adjusting the magnitude and polarity of the compensating field until the contribution to the magnetometer output caused by the identified component of eddy-current field is reduced to zero, and thereafter repeating the compensation process with other components until the total eddy-current magnetic field is compensated.

In accordance with the invention also, there is provided an eddy-current compensator comprising three pickup coils arranged to be mounted in the aircraft and to produce outputs proportional respectively to the time rate of change of the magnetic fields along the transverse, longitudinal, and vertical axes thereof; means for amplifying the voltages induced in these pickup coils when the aircraft maneuvers; three electromagnets mounted in the aircraft and oriented to produce magnetic fields respectively parallel to the transverse, longitudinal, and vertical axes thereof; and means for applying to each of the electromagnets currents proportional to the output voltages of each of the amplifiers, the currents applied to each of the electromagnets from each of the amplifiers being individually adjustable in magnitude.

For a better understanding of the invention, reference is made to the accompanying drawing, in which.

Figure 1:
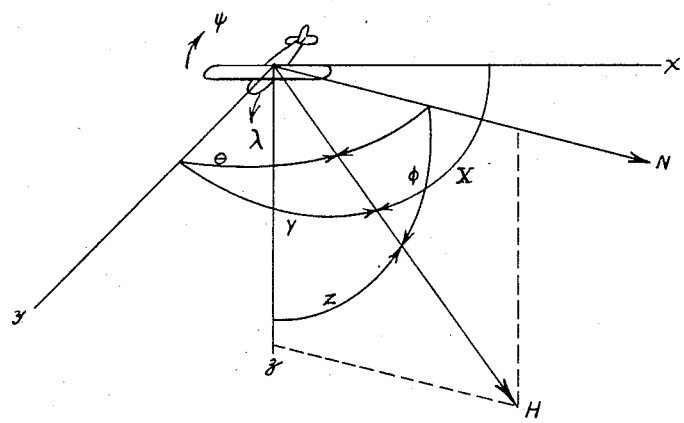
Fig. 1 is a diagram showing the relationships between the chosen reference axes, the aircraft, and the earth's magnetic vector.

Referring to Fig. 1, a set of orthogonal reference axes $x$, $y$ and $z$ is chosen in such manner that the $x$ axis coincides with the transverse axis of the aircraft, the $y$ axis with the longitudinal axis of the aircraft, and the $z$ axis with the vertical axis intersecting the transverse and longitudinal axes of the aircraft. The orientation of these axes in space in respect to the earth's magnetic vector, designated by the arrow marked H, is given by the angles X, Y and Z.

Resolving the earth's magnetic field along the reference axes, the magnitudes of the components are given by the following equations:

$$H_x = H \cos X \qquad (1)$$
$$H_y = H \cos Y$$
$$H_z = H \cos Z$$

The time rate of change of these field components is then obtained by differentiating Equations 1 in respect to time. This operation results in the following expressions:

$$\dot{H}_x = -H\dot{X} \sin X \qquad (2)$$
$$\dot{H}_y = -H\dot{Y} \sin Y$$
$$\dot{H}_z = -H\dot{Z} \sin Z$$

The time rate of change of each of these components may be considered to cause separate eddy-current magnetic fields at the origin of the reference system. Each of these eddy-current magnetic fields may in turn be resolved into components along the x, y and z axes. Thus the eddy-current magnetic field due to a time rate of change of the x component of the earth's magnetic field $(\dot{H}_x)$ may be expressed as follows:

$$\bar{H}'_x = A\dot{H}_x(\bar{i} \cos X'_x + \bar{j} \cos Y'_x + \bar{k} \cos Z'_x) \qquad (3)$$

Similar expressions may be written for the eddy-current magnetic fields due to a time rate of change of the $y$ component of the earth's magnetic field and of the $z$ component of the earth's magnetic field. Then $(\bar{H}_{ED})$, the total eddy-current field at the origin of the reference system, is equal to the sum of $(\bar{H}'_x)$, $(\bar{H}'_y)$ and $(\bar{H}'_z)$. This may be written as:

$$\bar{H}_{ED} = \begin{cases} A\dot{H}_x(\vec{i}\cos X'_x + \vec{j}\cos Y'_x + \vec{k}\cos Z'_x) + \\ B\dot{H}_y(\vec{i}\cos X'_y + \vec{j}\cos Y'_y + \vec{k}\cos Z'_y) + \\ C\dot{H}_z(\vec{i}\cos X'_z + \vec{j}\cos Y'_z + \vec{k}\cos Z'_z) \end{cases} \quad (4)$$

In Equation 4, $(A \cos X'_x)$, $(B \cos X'_y)$ $(C \cos Y'_z)$, etc., are constants determined by the structure of the aircraft. For ease in identification of these constants and to simplify subsequent equations, a double-letter nomenclature may be used. The first letter ($t$, $l$ or $v$) indicates the component of the earth's magnetic field causing the particular component of the eddy-current field to be identified, the letters $t$, $l$ and $v$ indicating earth's field components along the $x$, $y$ and $z$ axes, respectively. The second letter denotes the component of the eddy-current field generated by a change in the earth's magnetic field component designated by the first letter, the letters $t$, $l$ and $v$ indicating components along the $x$, $y$ and $z$ axes, respectively.

Substituting Equations 2 in Equation 4 and re-writing Equation 4 using the double-letter nomenclature just introduced, the following expression for the total eddy-current magnetic field is obtained:

$$\bar{H}_{ED} = -\bar{H} \begin{cases} \vec{i}(tt\dot{X}\sin X + lt\dot{Y}\sin Y + vt\dot{Z}\sin Z) + \\ \vec{j}(tl\dot{X}\sin X + ll\dot{Y}\sin Y + vl\dot{Z}\sin Z) + \\ \vec{k}(tv\dot{X}\sin X + lv\dot{Y}\sin Y + vv\dot{Z}\sin Z) \end{cases} (5)$$

Since the magnetometer is arranged to measure field components in the direction of the earth's magnetic field, only those components of the eddy-current magnetic field in that direction are significant. The total eddy-current magnetic field effective at the magnetometer is, therefore, a scalar and equals:

$$H_D =$$

$$H \begin{cases} tt\dot{X}\sin X\cos X + lt\dot{Y}\sin Y\cos X + vt\dot{Z}\sin Z\cos X + \\ tl\dot{X}\sin X\cos Y + ll\dot{Y}\sin Y\cos Y + vl\dot{Z}\sin Z\cos Y + \\ tv\dot{X}\sin X\cos Z + lv\dot{Y}\sin Y\cos Z + vv\dot{Z}\sin Z\cos Z \end{cases}$$

$$(6)$$

It will be recognized that, in general, changes in angles $X$, $Y$ and $Z$ are not a direct measure of the changes in attitude of the aircraft, since only under special conditions does the aircraft rotate about any of the $x$, $y$ and $z$ axes in performing maneuvers. It is necessary, therefore, to express angles $X$, $Y$ and $Z$ in terms of the angles $\theta$, $\varphi$, $\Psi$ and $\lambda$ of Fig. 1, where $\Psi$ and $\lambda$ are respectively the roll and pitch angles of the aircraft, $\varphi$ is the magnetic dip angle, these three angles being measured from the horizontal plane, and $\theta$ is the heading of the aircraft measured in the horizontal plane from magnetic north. The following expressions may then be obtained:

For rolls,
$$\cos X = \cos\varphi\cos\theta\cos\Psi + \sin\varphi\sin\Psi$$
$$\cos Y = \cos\varphi\cos\theta \quad (7)$$
$$\cos Z = \sin\varphi\cos\Psi - \cos\varphi\cos\theta\sin\Psi$$

For pitches,
$$\cos X = \cos\varphi\sin\theta$$
$$\cos Y = \cos\varphi\sin\theta\cos\lambda + \sin\varphi\sin\lambda \quad (8)$$
$$\cos Z = \sin\varphi\cos\lambda - \cos\varphi\cos\theta\sin\lambda$$

Differentiating the expressions of Equations 8 in respect to time, the following relations are obtained for rolls:

$$\frac{d}{dt}\cos X = -\dot{X}\sin X =$$
$$(-\cos\varphi\sin\theta\sin\Psi + \sin\varphi\sin\Psi)\dot{\Psi}$$

$$\frac{d}{dt}\cos Y = -\dot{Y}\sin Y = 0 \quad (9)$$

$$\frac{d}{dt}\cos Z = -\dot{Z}\sin Z = (-\sin\varphi\sin\Psi - \cos\varphi\sin\theta\cos\Psi)\dot{\Psi}$$

In a similar manner, the following relations for pitches may be obtained:

$$\frac{d}{dt}\cos X = -\dot{X}\sin X = 0$$

$$\frac{d}{dt}\cos Y = -\dot{Y}\sin Y = (-\cos\varphi\cos\theta\sin\lambda + \sin\varphi\cos\lambda)\dot{\lambda}$$
$$(10)$$

$$\frac{d}{dt}\cos Z = -\dot{Z}\sin = (-\sin\varphi\sin\lambda - \cos\varphi\cos\theta\cos\lambda)\dot{\lambda}$$

It will appear from Equations 7, 8, 9 and 10, that for rolls, $$\frac{d}{dt}\cos X = -\dot{X}\sin X = \dot{\Psi}\cos Z \quad (11)$$

$$\frac{d}{dt}\cos Z = -\dot{Z}\sin Z = -\dot{\Psi}\cos X$$

and for pitches, $$\frac{d}{dt}\cos Y = -\dot{Y}\sin Y = -\dot{\lambda}\cos Z \quad (12)$$

$$\frac{d}{dt}\cos Z = -\dot{Z}\sin Z = -\dot{\lambda}\cos Y$$

Substituting Equations 11 and 12 in Equation 6, the following expression is obtained for the effective eddy-current magnetic field produced when the aircraft rolls:

$$H_D = H\dot{\Psi}[(vv - tt)\cos Z\cos X + vt\cos^2 X - tl\cos Y\cos Z + vl\cos Y\cos Z - tv\cos^2 Z] \quad (13)$$

A similar equation may be derived for the total effective eddy-current magnetic field for pitches, as follows:

$$H_D = H\dot{\lambda}[-lt\cos X\cos Z + vt\cos X\cos Y + (vv - ll)\cos Y\cos Z + vl\cos^2 Y - lv\cos^2 Z] \quad (14)$$

It will be noted that in Equation 13 the quantities $vv$ and $tt$ have the same generating function, namely $\cos X \cos Z$, and that a similar relationship exists as to $vv$ and $ll$ in Equation 14. Thus these pairs of terms cannot be separated by any maneuver insofar as their effect on the magnetometer is concerned. On the other hand, both terms of these pairs may be compensated by varying either one of the component terms.

As indicated above, the compensation method contemplates the use of aircraft maneuvers such that the output of the magnetometer is proportional to an identifiable component of the eddy-current magnetic field, and the compensation of that component by the production of a field of proper magnitude and polarity and in the proper direction to reduce the output of the magnetometer due to the component substantially to zero. A compensator for producing such compensating fields is shown in Fig. 2.

Figure 2:
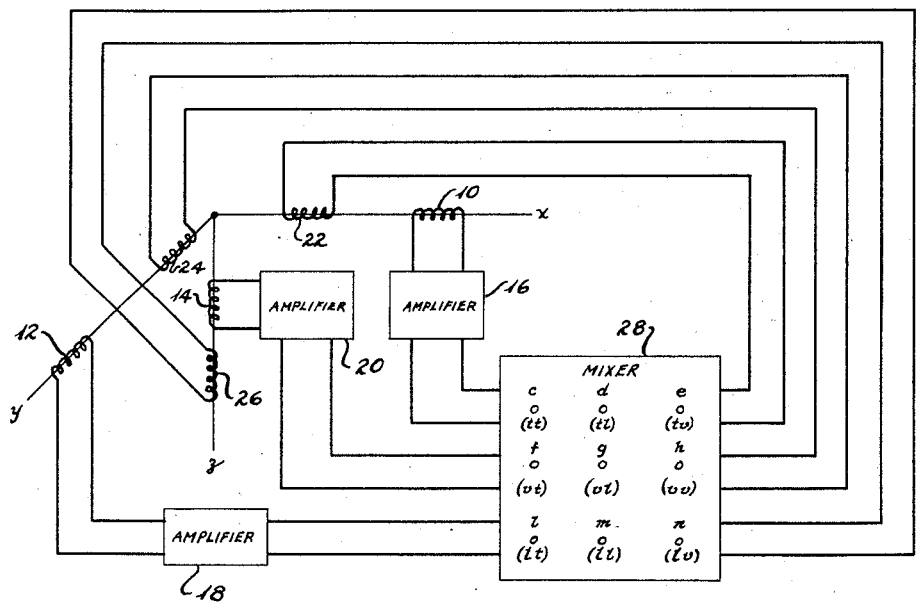
Fig. 2 is a schematic diagram of an eddy-current compensator in accordance with the invention.
Figure 3:
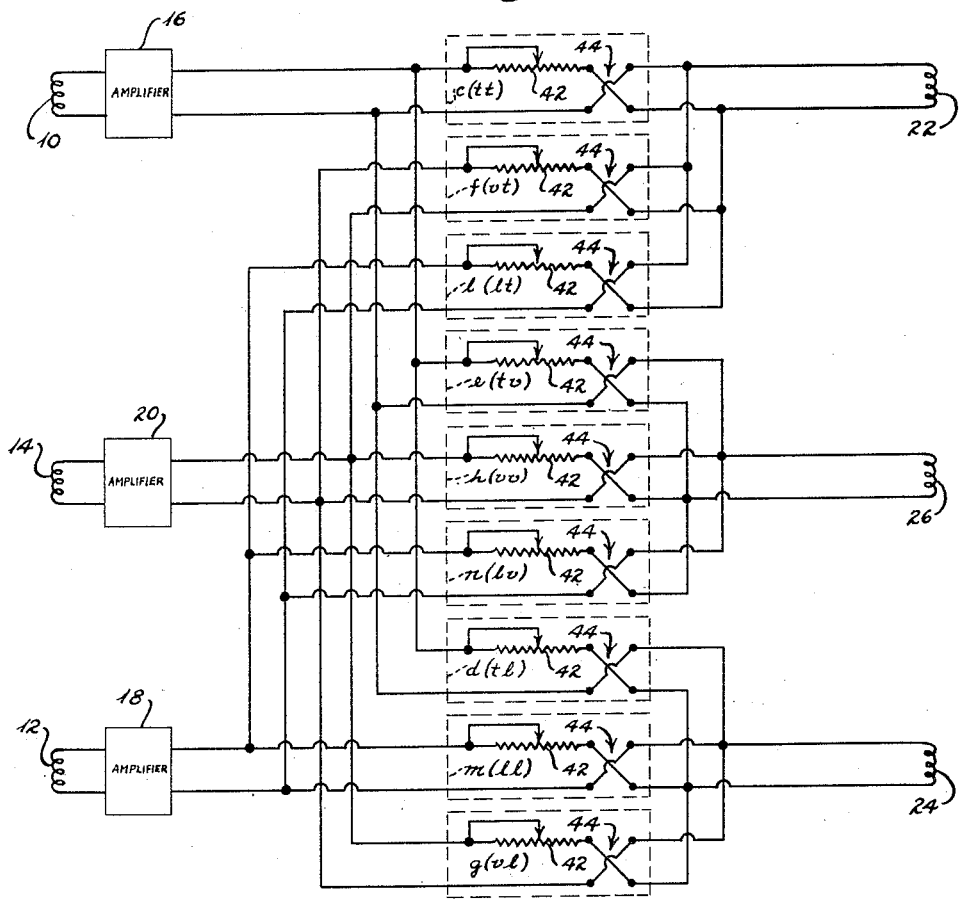
Fig. 3 is a schematic diagram of the apparatus shown in Fig. 2 showing the details of the mixer.

The compensator of Fig. 2 comprises three pickup coils 10, 12 and 14, arranged to be mounted in the aircraft with their axes parallel respectively to the $x$, $y$ and $z$ axes. The voltage induced in each of these pickup coils will be proportional to the time rate of change of magnetic flux in the direction of its axis. From Equation 2, it is seen that the time rate of change of flux in the direction of the $x$ axis is equal to $(-H\dot{X}\sin X)$, while that from the $y$ axis is $(-H\dot{Y}\sin Y)$ and that from the z axis is $(-H\dot{Z} \sin Z)$. The voltages induced in the three pickup coils may then be expressed as follows:

$$E_x = kH\dot{X} \sin X$$
$$E_y = kH\dot{Y} \sin Y \quad (15)$$
$$E_z = kH\dot{Y} \sin Z$$

where $E_x$ is the voltage induced in pickup coil 10, $E_y$ that induced in coil 12, etc., and $k$ is in each case a proportionality factor. The outputs of pickup coils 10, 12 and 14 are applied respectively to high-fidelity amplifiers 16, 18 and 20, the outputs of which are merely the amplified input voltages.

Electromagnets 22, 24 and 26 are mounted in the aircraft in such a fashion that they produce magnetic fields parallel respectively to the $x$, $y$ and $z$ axes. These electromagnets may be simple solenoidal coils, either with or without cores. A mixer 28 is provided whereby currents of individually adjustable magnitude and proportional respectively to each of the output voltages of amplifiers 16, 18 and 20 may be applied to each of electromagnets 22, 24 and 26.

It will be understood that, in order to meet the requirements mentioned above, mixer 28 must be provided with nine controls. As seen in Fig. 2, each of the nine controls includes a variable resistance 42 and a reversing switch 44. If the mixing coefficients introduced by the controls for the three electromagnet currents proportional to the output of amplifier 16 are designated as $c$, $d$ and $e$, the field at the origin of the reference system due to the time rate of change of magnetic flux in the direction of the $x$ axis is given by the following expression:

$$\bar{H}_{Ix} = kH\dot{X} \sin X \, (\bar{i}c + \bar{j}d + \bar{k}e) \quad (16a)$$

In similar fashion, expressions for the compensator fields at the origin of the reference system due to time rate of change of flux along the $y$ and $z$ axes may be written:

$$\bar{H}_{Iy} = kH\dot{Y} \sin Y \, (\bar{i}l + \bar{j}m + \bar{k}n) \quad (16b)$$

and $$\bar{H}_{Iz} = kH\dot{Z} \sin Z \, (\bar{i}f + \bar{j}g + \bar{k}h) \quad (16c)$$

where $l$, $m$ and $n$ are the coefficients introduced by mixing controls for the output of amplifier 18, $f$, $g$, and $h$ are the mixing coefficients for the output of amplifier 20.

The total magnetic field at the origin of the reference system produced by the three electromagnets may then be written as follows:

$$\bar{H}_{ID} = kH \begin{Bmatrix} \bar{i}(c\dot{X} \sin X + l\dot{Y} \sin Y + f\dot{Z} \sin Z) + \\ \bar{j}(d\dot{X} \sin X + m\dot{Y} \sin Y + g\dot{Z} \sin Z) + \\ \bar{k}(e\dot{X} \sin X + n\dot{Y} \sin Y + h\dot{Z} \sin Z) \end{Bmatrix} \quad (17)$$

It will be recognized that this expression is of the same form as Equation 5, the correspondence between the two equations being as indicated in the following table:

| Mixing Coefficient | Field Coefficient |
|---|---|
| c | tt |
| d | tl |
| e | tv |
| f | vt |
| g | vl |
| h | vv |
| l | lt |
| m | ll |
| n | lv |

Accordingly, it will be understood that appropriate compensating fields may be produced by the system of Fig. 2 to eliminate the effect on the magnetometer of any component of the eddy-current magnetic field of the aircraft.

In the practice of the compensation method of the invention, it is convenient to cause the aircraft to maneuver harmonically to assist in the determination and separation of the various components of the eddy current magnetic field.

Accordingly, $$\lambda = a \sin \omega t$$
$$\psi = b \sin \omega t \quad (18)$$

where $a$ is the pitch amplitude and $b$ is the roll amplitude. Using series expansions, the several generating functions of Equations 13 and 14 may be determined in terms of Equations 18. Each of the generating functions will yield terms in the fundamental $(\omega t)$, and in higher harmonics of the maneuver frequency. Since the fundamental term is generally about ten times as large as the higher harmonic terms, the higher harmonic terms may to a first approximation be ignored. Then for values $a$ and $b$ less than one radian, the following tables may be derived:

| Generating Function | $\omega \cos \omega t$ (fundamental) term |
|---|---|
| ROLLS | |
| $\cos X \cos Z$ | $\frac{b}{2} \sin 2\varphi \sin \theta$ |
| $-\cos Y \cos Z$ | $-\frac{b}{2} \sin 2\varphi \cos \theta$ |
| $\cos Y \cos X$ | $\frac{b}{2} \cos 2\varphi \sin 2\theta$ (19) |
| $\cos^2 X$ $-\cos^2 Z$ | $b \cos^2 \varphi \sin^2 \theta$ $-b \sin^2 \varphi$ |
| PITCHES | |
| $-\cos X \cos Z$ | $-\frac{a}{2} \sin 2\varphi \sin \theta$ |
| $\cos Y \cos Z$ | $\frac{a}{2} \sin 2\varphi \cos \theta$ |
| $\cos X \cos Y$ | $\frac{a}{2} \cos^2 \varphi \sin 2\theta$ (20) |
| $\cos^2 Y$ $-\cos^2 Z$ | $a \cos^2 \varphi \cos^2 \theta$ $-a \sin^2 \varphi.$ |

The compensation procedure according to the invention contemplates causing the aircraft to maneuver in such fashion that the eddy-current magnetic field effecting the output of the magnetometer mounted therein is proportional to one or more separately identifiable components of the total eddy-current magnetic field. The specific procedure using the compensator of Fig. 2 for compensation of all of the field components of Equations 13 and 14 will now be described.

The aircraft is flown in an area relatively free of magnetic gradients, and a series of maneuvers including rolls and pitches on various headings is performed. First the aircraft is rolled harmonically at a frequency of about one-sixth cycle per second on a north heading. Angle $\theta$ is then zero and the output of the magnetometer, being proportional to the magnetic field acting in the direction of the earth's magnetic field, may be determined from Equation 19. It is seen that this output is proportional to:

$$-\omega t l \frac{b}{2} \sin 2\varphi - \omega t v \sin^2 \varphi \quad (21)$$

The plane is then flown on a south heading and rolls of the same amplitude and frequency are performed, the resultant output of the magnetometer then being proportional to:

$$\omega t l \frac{b}{2} \sin 2\varphi - \omega t v \sin^2 \varphi \qquad (22)$$

It will be noted that the output of the magnetomer for both north- and south-heading rolls is proportional to two terms, and that one of these terms changes sign between north and south headings. Consequently, the two terms may be compensated separately. For this purpose, the $tl$ control of mixer 28 of the compensator is adjusted until equal magnetometer outputs are obtained on north- and south-heading rolls of the same amplitude and frequency. The $tl$ term having thus been compensated, the $tv$ control of the mixer is adjusted until no output signal is obtained on either north- or south-heading rolls, thus compensating the $tv$ term.

The above procedure having been carried out, the aircraft is rolled harmonically at a frequency of approximately one-sixth cycle per second on an east heading, producing a magnetometer output proportional to:

$$\omega\left(vv - tt\frac{b}{2}\sin 2\varphi + \omega vtb \cos^2 \varphi\right) \qquad (23)$$

The aircraft is then rolled at the same angular frequency and amplitude on a west heading, producing an output proportional to:

$$-\omega(vv-tt)\frac{b}{2}\sin 2\varphi + \omega vtb \cos^2 \varphi \qquad (24)$$

As in the expressions (21) and (22), it will be seen that the output signals for the east- and west-heading rolls are proportional to two terms, one of which changes sign between east and west headings. Accordingly, either the $vv$ control or $tt$ control of mixer 28 is adjusted until equal magnetometer outputs are obtained for equal east- and west-heading rolls. This procedure compensates the $(vv-tt)$ term. Thereafter the $vt$ control is adjusted until no output is obtained for either east- or west-heading rolls, thereby compensating the $vt$ term.

The only remaining uncompensated term of Equation 13 is $vl$. In order to effect compensation of this term, the aircraft is rolled on any intercardinal heading. The output of the magnetometer is then proportional to:

$$\omega v l \frac{b}{2} \cos^2 \varphi \qquad (25)$$

The $vl$ control of mixer 28 is adjusted until no output is obtained for this maneuver, thereby compensating the $vl$ term.

At the completion of the procedure outlined above, $(vv-ll)$, $lv$ and $lt$ remain to be compensated. Accordingly, the aircraft is pitched harmonically on north and south headings, the frequency and amplitude of the maneuver being the same for the two headings. The outputs for the two maneuvers are proportional respectively to:

$$\omega(vv-ll)\frac{a}{2}\sin 2\varphi - \omega l v a \sin^2 \varphi \qquad (26)$$

and $$-\omega(vv-ll)\frac{a}{2}\sin 2\varphi - \omega l v a \sin^2 \varphi \qquad (27)$$

Adjustment of either the $vv$ or $ll$ mixer controls is made until outputs of equal amplitude are obtained for equal north- or south-heading pitches. This procedure compensates the $(vv-ll)$ term, making possible compensation of the $lv$ term through adjustment of mixer control $lv$ until no output is obtained for either north- or south-heading pitches.

The remaining uncompensated term may then be compensated by pitching the aircraft on an east heading. All the other terms having previously been compensated, the output of the magnetometer is proportional only to:

$$\frac{a}{2}\omega lt \sin 2\varphi \qquad (28)$$

This term may be compensated through adjustment of mixer control $lt$ until no output is obtained.

Figure 4:
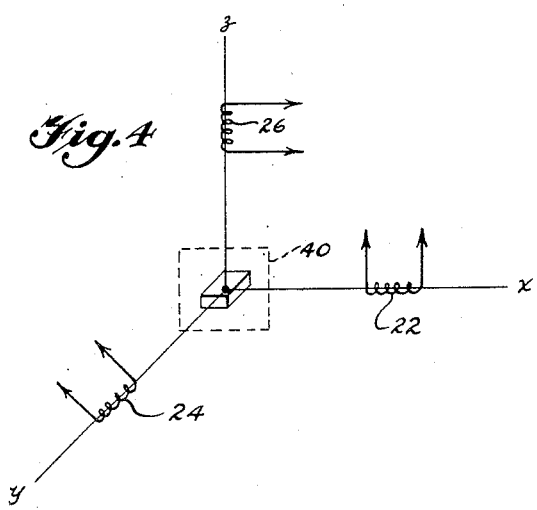
Fig. 4 is a schematic diagram showing the arrangement of the compensating coils to the sensitive magnetometer to be compensated.

The overall compensation of the aircraft for eddy-current magnetic fields is then complete and may be checked by causing the aircraft to perform the most violent maneuvers that will be performed in practice and examining the output of the magnetometer, illustrated by numeral 40 in Fig. 4 and shown to be located at the junction of the axes of coils 22, 24 and 26. In most cases, compensation of the eight fundamental terms as described above will be sufficient to achieve adequate compensation of the aircraft. In rare cases, interfering fields due to higher-harmonic terms may be present and these may be compensated by methods of analysis and maneuver entirely analogous to those described above.

It will be understood that most of the eddy-current field compensation problems are much simpler than the case described involving eight terms and that in some instances adequate compensation may be achieved using fewer pickup coils and fewer adjustment procedures. The simplest case is that in which the eddy-current magnetic field is due entirely to the time rate of change of the earth's magnetic field in a single direction, a single pickup coil and compensating electromagnet being the only compensating apparatus required. In addition, it is pointed out that after the several components of interfering eddy-current magnetic field have been determined through the analysis method of the invention, compensation may be effected in the simpler cases using non-electronic or passive devices, as for example short-circuited turns positioned adjacent the location at which compensation is to be effected.

Having thus described my invention, what I claim as new and desire to secure by Letters Patent of the United States is:

1. The method of compensating the eddy-current magnetic field of an aircraft to facilitate operation of a magnetometer or other magnetic field responsive instrument mounted therein for measuring magnetic fields or the like, and having a coil element along any one or all of the three major axes of said aircraft, namely the transverse, longitudinal and vertical axes which includes causing the aircraft to maneuver in such fashion that a component of eddy-current magnetic field along one of said major axes produces an identifiable contribution to the output of the magnetometer or other instrument, producing a compensating field effective along said one axis, adjusting the magnitude and polarity of the compensating field until the contribution to the magnetometer output caused by the identified component of eddy-current field is reduced to zero, and thereafter repeating the steps of maneuvering and compensating along each of the other of said axes on which said instrument has coil elements until the total eddy-current magnetic field is compensated.

2. An eddy-current compensator for a magnetic instrument comprising three pickup coils arranged to be mounted anywhere in the aircraft but with their axes parallel to the three major axes of the aircraft respectively and to produce outputs proportional respectively to the time rates of change of the magnetic fields along the transverse, longitudinal and vertical axes thereof; means for amplifying the voltages induced in these pickup coils when the aircraft maneuvers; three electromagnets mounted in the aircraft near the site of the magnetic instrument to be compensated and oriented to produce magnetic fields respectively along the transverse, longitudinal and vertical axes thereof; and means for conducting to each of the electromagnets currents proportional to the sum of any portions of each of the three amplifier output voltages including means for adjusting said portions for delivery to each of the electromagnets from each of the amplifiers.

References Cited in the file of this patent

UNITED STATES PATENTS

| | | |
|---|---|---|
| 1,596,639 | Vion | Aug. 17, 1926 |
| 2,054,318 | Gunn | Sept. 15, 1936 |
| 2,054,672 | Edgar | Sept. 15, 1936 |
| 2,241,499 | Barth | May 13, 1941 |
| 2,406,870 | Vacquier | Sept. 3, 1946 |
| 2,412,617 | Jenkins | Dec. 17, 1946 |
| 2,421,583 | Stuart | June 3, 1947 |
| 2,427,666 | Felch et al. | Sept. 23, 1947 |

OTHER REFERENCES

Burt et al.: Electric Circuits and the Magnetic Compass, A. I. E. E. Technical paper 44–7, December 1943; pages 1–4.